United States Patent
Yang et al.

(10) Patent No.: US 10,416,792 B2
(45) Date of Patent: *Sep. 17, 2019

(54) GESTURE DETECTION DEVICE FOR DETECTING HOVERING AND CLICK

(71) Applicant: PixArt Imaging Inc., Hsin-Chu County (TW)

(72) Inventors: Shu-Sian Yang, Hsin-Chu County (TW); Han-Ping Cheng, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,086

(22) Filed: Mar. 21, 2019

(65) Prior Publication Data

US 2019/0220110 A1 Jul. 18, 2019

Related U.S. Application Data

(63) Continuation of application No. 15/828,620, filed on Dec. 1, 2017, which is a continuation of application No. 15/086,371, filed on Mar. 31, 2016, now abandoned, which is a continuation of application No. 14/149,115, filed on Jan. 7, 2014, now Pat. No. 9,423,893.

(30) Foreign Application Priority Data

Jan. 31, 2013 (TW) .............................. 102103850 A (51) Int. Cl.
| | |
|---|---|
| *G09G 5/00* | (2006.01) |
| *G06F 3/0354* | (2013.01) |
| *G06F 3/03* | (2006.01) |
| *G06F 3/042* | (2006.01) |
| *G06F 3/0488* | (2013.01) |

(52) U.S. Cl.
CPC ........ *G06F 3/03547* (2013.01); *G06F 3/0304* (2013.01); *G06F 3/042* (2013.01); *G06F 3/04883* (2013.01); *G06F 2203/04101* (2013.01); *G06F 2203/04108* (2013.01)

(58) Field of Classification Search
CPC ...... G06F 3/017; G06F 3/0304; G06F 3/0428; G06F 3/04883; G06F 2203/04101; G06F 2203/04108; G06F 2203/04808; G06T 7/0042; G06T 2207/10021; G06T 2207/10028; G06T 2207/30196
See application file for complete search history.

(56) References Cited

U.S. PATENT DOCUMENTS

2014/0168065 A1* 6/2014 Huang .................... G06F 3/017
345/156

* cited by examiner

*Primary Examiner* — Nelson M Rosario
(74) *Attorney, Agent, or Firm* — WPAT, PC (57) ABSTRACT

There is provided a gesture detection device including two linear image sensor arrays and a processing unit. The processing unit is configured to compare sizes of pointer images in the image frames captured by the two linear image sensor arrays in the same period or different periods so as to identify a click event.

20 Claims, 9 Drawing Sheets

GESTURE DETECTION DEVICE FOR DETECTING HOVERING AND CLICK

CROSS REFERENCE TO RELATED APPLICATION

This application is a continuation application of U.S. application Ser. No. 15/828,620, filed on Dec. 1, 2017, which is a continuation application of U.S. application Ser. No. 15/086,371, filed on Mar. 31, 2016, which is a continuation application of U.S. application Ser. No. 14/149,115, filed on Jan. 7, 2014, the disclosure of which is hereby incorporated by reference herein in its entirety. This application claims the priority benefit of Taiwan Patent Application Serial Number 102103850, filed on Jan. 31, 2013, the full disclosure of which is incorporated herein by reference.

BACKGROUND

1. Field of the Disclosure

This disclosure generally relates to a human-machine interaction system and, more particularly, to an optical gesture detection device capable of performing the hover detection and the click detection.

2. Description of the Related Art

As the hand gesture control is operated according to human instinct such that it is widely applied to home appliances and portable electronic devices. The user can implement the specific function only by giving predetermined postures.

In this way, more operating functions can be provided in addition to the traditional functions provided by pressing buttons.

The hand gesture control can be divided into the touch control and the hover control according to the operating method thereof, wherein the touch control system generally employs a touch panel such that the user can perform the slide control and the click control on the touch panel. However, the touch panel itself has a high manufacturing cost.

The hover control system generally utilizes an image sensor to detect the hovering gesture, i.e. the optical gesture control system. For example, a camera can be used to capture two-dimensional image frames and the move information can be identified according to the position variation of finger in the successive two-dimensional image frames. However, it is difficult for the hover control system to detect the click event, which is also an important issue in the field.

Accordingly, the present disclosure further provides a gesture detection device that may detect both the hovering operation and click operation by using at least two image sensors and eliminate the interference caused by ambient light.

SUMMARY

The present disclosure provides a gesture detection device that employs the linear image sensor array so as to reduce the cost and increase the number of detectable images per second.

The present disclosure further provides a gesture detection device that may eliminate the interference of ambient light by calculating the differential image thereby improving the identification accuracy.

The present disclosure provides a gesture detection device including a detection surface, an infrared light source, a first image sensor and a second image sensor. The detection surface has a normal direction. The first image sensor is disposed on the detection surface, and configured to capture, along a direction deviating a predetermined angle from the normal direction, a first image when the infrared light source is emitting light. The second image sensor is disposed on the detection surface, offset by a predetermined distance from the first image sensor along a Z-axis, and the second image sensor configured to capture, along a direction deviating a negative predetermined angle from the normal direction, a second image when the infrared light source is emitting light. The detection surface has two opposite long edges along an X-axis and two opposite short edges along the Z-axis, and the first image sensor and the second image sensor are distanced by a distance along the X-axis.

The present disclosure further provides a gesture detection device including a detection surface, an infrared light source, a first image sensor and a second image sensor. The detection surface has a normal direction. The first image sensor is disposed on the detection surface, and configured to capture, along a direction deviating a predetermined angle from the normal direction, first images when the infrared light source is emitting light. The second image sensor is disposed on the detection surface parallel to the first image sensor in an X-axis, and the second image sensor configured to capture, along a direction deviating a negative predetermined angle from the normal direction, second images when the infrared light source is emitting light. The detection surface has two opposite long edges along the X-axis and two opposite short edges along a Z-axis, and the first image sensor and the second image sensor are distanced by a distance along the X-axis.

The present disclosure further provides a gesture detection device including a detection surface, an infrared light source, a first image sensor, a second image sensor and a third image sensor. The detection surface has a normal direction. The first image sensor is disposed on the detection surface, and configured to capture, along a direction deviating a predetermined angle from the normal direction, a first image at when the infrared light source is emitting light. The second image sensor is disposed on the detection surface parallel to the first image sensor in an X-axis, and the second image sensor configured to capture, along a direction deviating a negative predetermined angle from the normal direction, a second image when the infrared light source is emitting light. The third image sensor is disposed on the detection surface, offset by a predetermined distance from the first image sensor and the second image sensor along a Z-axis, and the third image sensor configured to capture, along the normal direction, a third image when the infrared light source is emitting light. The detection surface has two opposite long edges along the X-axis and two opposite short edges along the Z-axis, and the first image sensor and the second image sensor are distanced by a distance along the X-axis.

In one aspect, when sizes of the pointer images in the first image and the second image are substantially identical and larger than or equal to a predetermined size, it means that the pointer images are not finger images and thus the processing unit does not calculate the hover coordinate and does not identify the click event.

In one aspect, the gesture detection device may further include an infrared light source configured to illuminate field of views of the image sensors, wherein the infrared light source may emit light alternatively in a first brightness value and a second brightness value. The image sensors may respectively capture a bright image corresponding to the first brightness value and a dark image corresponding to the second brightness value. The processing unit may calculate a differential image between the bright image and the dark image captured by each image sensor so as to eliminate the interference of ambient light, wherein the first brightness value may be larger than the second brightness value, and the second brightness value may be zero or nonzero brightness.

In one aspect, the image sensors include a linear image sensor array, e.g. having 750 pixels in length and 1-6 pixels in width, to form a linear field of view.

The gesture detection device according to the embodiment of the present disclosure may be formed as an independent detection device and coupled to the electronic device having a screen, e.g. a smart TV, through wireless communication (for example, but not limited to, the bluetooth communication or microwave communication) or wired interface (for example, but not limited to, the USB interface). In addition, the gesture detection device according to the embodiment of the present disclosure may be directly integrated in the portable electronic device having a screen, e.g. notebook computers, personal digital assistances or cell phones.

In the gesture detection device according to the embodiment of the present disclosure, the image sensors may be arranged to capture image frames toward a direction substantially along a normal line or a direction inwardly deviating a predetermined angle from the normal line according to the distance between the image sensors such that a pointer image may simultaneously appear in field of views of all the image sensors.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
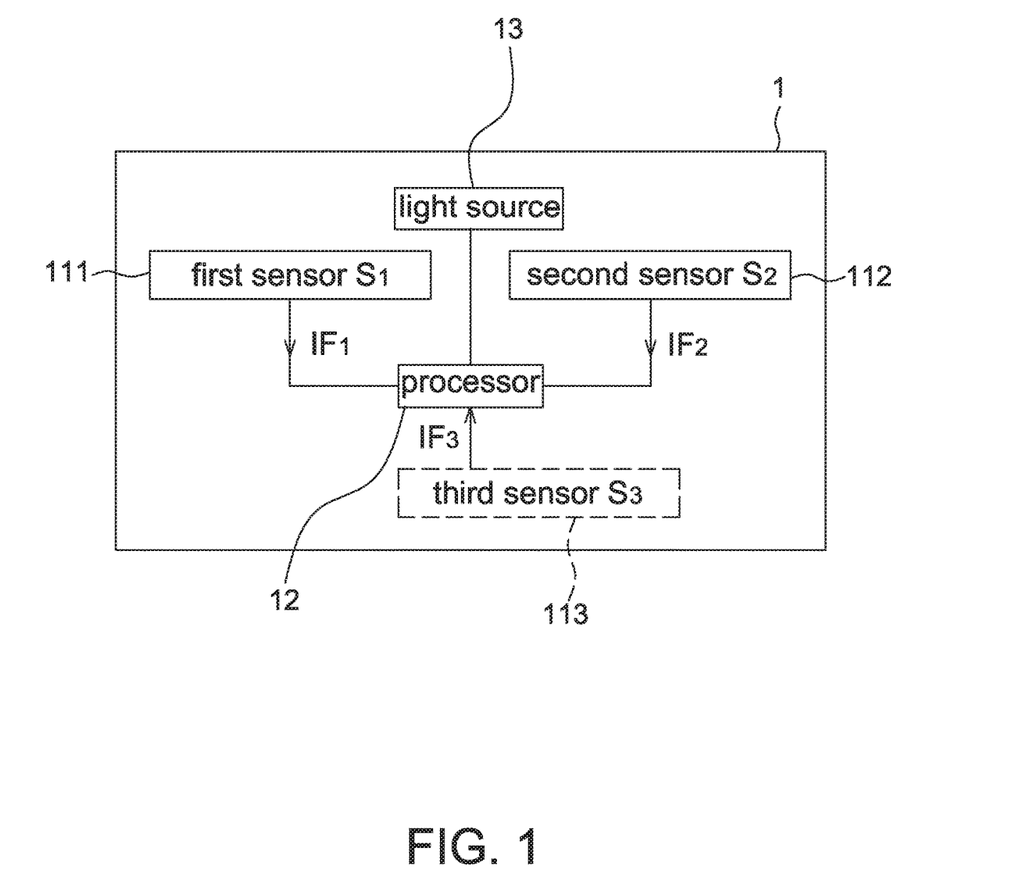
FIG. 1 shows a schematic block diagram of the gesture detection device according to an embodiment of the present disclosure.

Referring to FIG. 1, it shows a schematic block diagram of the gesture detection device 1 according to an embodiment of the present disclosure. The gesture detection device 1 includes at least two image sensors, a processing unit 12 and a light source 13. The number of the image sensors may be determined according to different applications. In one embodiment, the gesture detection device 1 may include a first image sensor ($S_1$) 111 and a second image sensor ($S_2$) 112. In another embodiment, the gesture detection device 1 may include a first image sensor ($S_1$) 111, a second image sensor ($S_2$) 112 and a third image sensor ($S_3$) 113. The processing unit 12 may be a digital signal processor and configured to receive image frames outputted by the at least two image sensors for post-processing to accordingly identify a two-dimensional coordinate of the hovering operation and a click event. The light source 13 is configured to illuminate field of views of the at least two image sensors and preferably emit invisible light, e.g. infrared light. In one embodiment, in order to eliminate the interference from ambient light, the light source 13 may emit light with different brightness values corresponding to the image capturing of the at least two image sensors (described later).

In addition, in order to decrease the cost and increase the number of detectable images per second, the at least two image sensors may be active image sensors, e.g. CMOS image sensors, and respectively may include a linear image sensor array, wherein the term "linear" herein is referred to the image sensor array having a length much larger than a width thereof, e.g. 750 pixels in length and 1-6 pixels in width so as to form a linear field of view. In addition, the light source 13 may be formed by arranging a plurality of active light sources or may be a single active light source (e.g. LED) as long as enough brightness can be provided thereby.

Figure 2A:
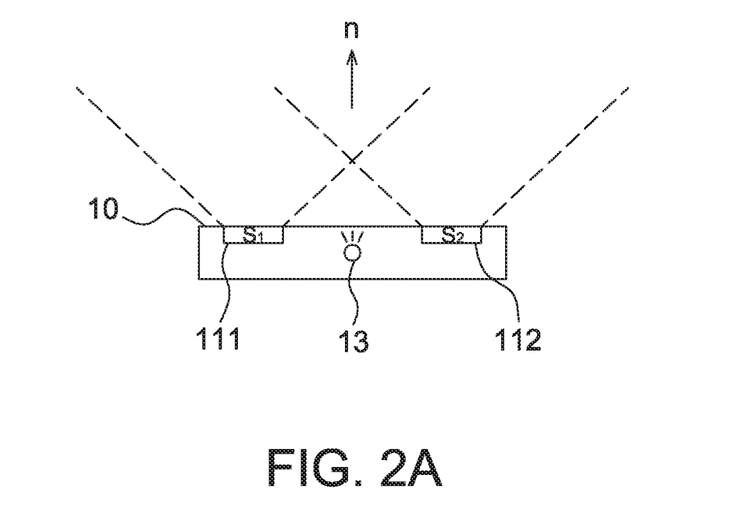
FIGS. 2A and 2B show schematic diagrams of the gesture detection device according to a first embodiment of the present disclosure.
Figure 2B:
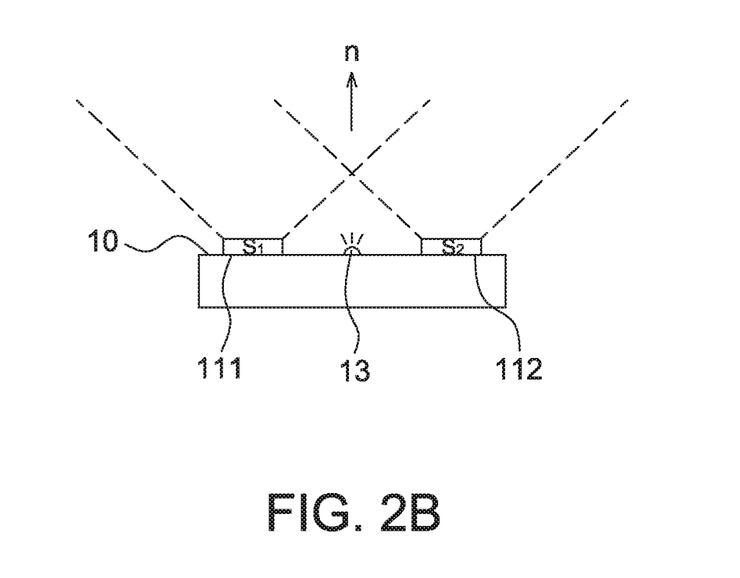

Referring to FIGS. 2A and 2B, they show schematic diagrams of the gesture detection device 1 according to a first embodiment of the present disclosure, which includes a detection surface 10, and a normal direction of the detection surface 10 is indicated by "n". The first image sensor 111 and the second image sensor 112 are disposed on the detection surface 10 and configured to capture image frames substantially toward the normal direction "n"; that is, the first image sensor 111 and the second image sensor 112 are arranged in the way so that sensing surfaces thereof are substantially parallel to the detection surface 10. In one embodiment, the first image sensor 111, the second image sensor 112 and the light source 13 may be disposed at an inner side of the detection surface 10 as shown in FIG. 2A. In another embodiment, the first image sensor 111, the second image sensor 112 and the light source 13 may be disposed on the detection surface 10 as shown in FIG. 2B. In this embodiment, center lines of the field of views of the first image sensor 111 and the second image sensor 112 may have an included angle, e.g. 0-20 degrees, with respect to the normal direction "n" so as to use the hovering operation algorithm of the first embodiment of the present disclosure mentioned below to calculate the hover coordinate, wherein the included angle preferably rotate toward a center position between the two image sensors.

Figure 3A:
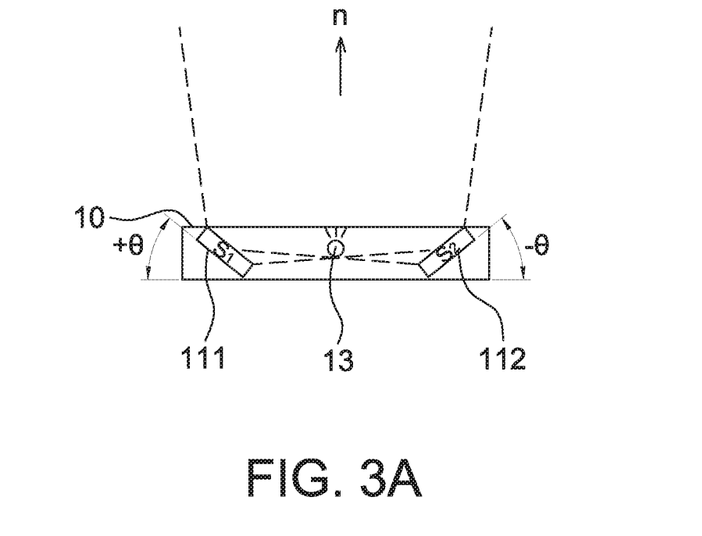
FIGS. 3A and 3B show schematic diagrams of the gesture detection device according to a second embodiment of the present disclosure.
Figure 3B:
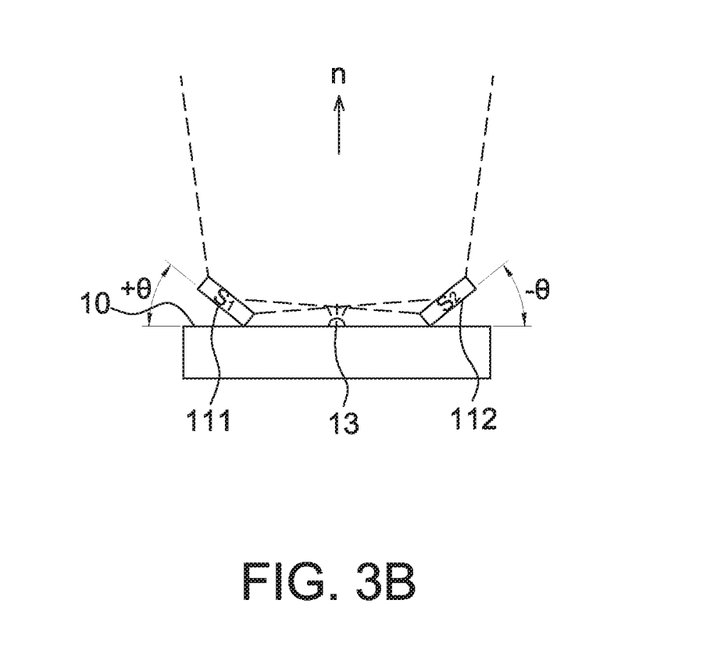

Referring to FIGS. 3A and 3B, they show schematic diagrams of the gesture detection device 1 according to a second embodiment of the present disclosure, which includes a detection surface 10, and a normal direction of the detection surface 10 is indicated by "n". The first image sensor 111 and the second image sensor 112 are disposed on the detection surface 10 and configured to capture image frames toward a direction deviating a predetermined angle from the normal direction "n"; that is, the first image sensor 111 and the second image sensor 112 are arranged in the way so that sensing surfaces thereof rotate with respect to the detection surface 10 by the predetermined angle. In one embodiment, the first image sensor 111, the second image sensor 112 and the light source 13 may be disposed at an inner side of the detection surface 10 as shown in FIG. 3A. In another embodiment, the first image sensor 111, the second image sensor 112 and the light source 13 may be disposed on the detection surface 10 as shown in FIG. 3B. In this embodiment, center lines of the field of views of the first image sensor 111 and the second image sensor 112 preferably have a predetermined angle, e.g. θ=30-60 degrees, with respect to the normal direction "n" so as to use the hovering operation algorithm of the second embodiment of the present disclosure mentioned below to calculate the hover coordinate, wherein the predetermined angle preferably rotate toward a center position between the two image sensors. As shown in FIGS. 3A and 3B, the first image sensor 111 rotates an angle of +θ whereas the second image sensor 112 rotates an angle of −θ, wherein the symbols ±herein indicate opposite rotation directions.

It is appreciated that when the image sensors are disposed at an inner side of the detection surface 10, preferably at least a part of the detection surface 10 is transparent to the light emitted by the light source 13; for example, a transparent cover may be used to cover thereon so as to protect elements inside the detection surface 10. When the image sensors and the light source are disposed on the detection surface 10, a transparent cover may also be used to cover thereon so as to protect the elements.

Figure 4A:
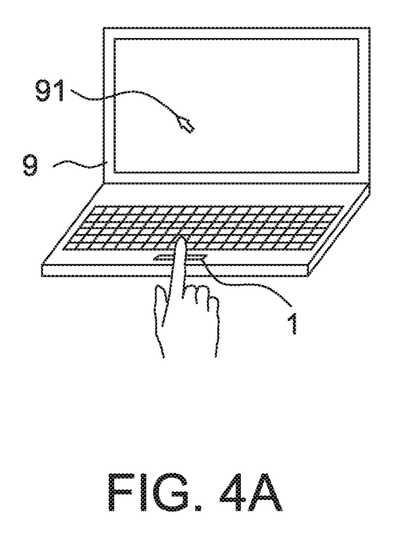
FIGS. 4A-4C show schematic diagrams of an electronic device in cooperation with the gesture detection device according to the embodiment of the present disclosure.
Figure 4B:
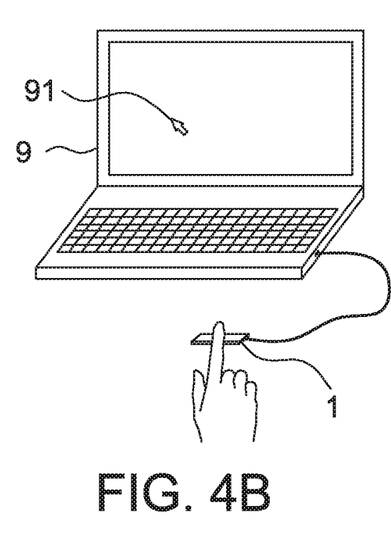
Figure 4C:
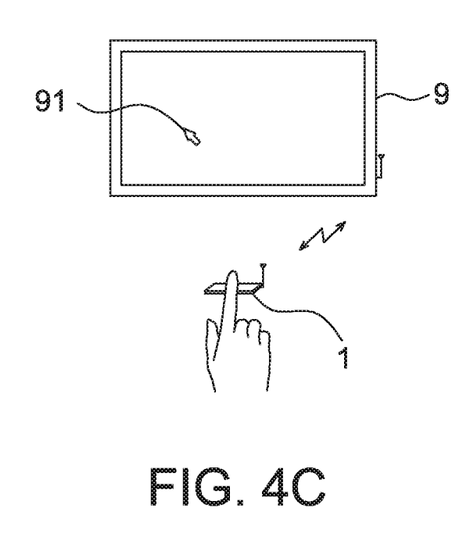

The gesture detection device 1 according to the embodiment of the present disclosure may be integrated with a portable electronic device, e.g. a notebook computer, a tablet computer, a cell phone or a personal digital assistance and configured to detect a hover coordinate of a pointer (e.g. a finger) and a click event as shown in FIG. 4A. In addition, the gesture detection device 1 may be formed as an independent device and wired (as shown in FIG. 4B) or wirelessly (as shown in FIG. 4C) coupled to an electronic device 9 having a screen, e.g. a computer system, a television or a projection system. It is appreciated that the gesture detection device 1 may include a transmission unit configured to wired or wirelessly transmit the detected results to the electronic device 9. In one embodiment, the hover coordinate detected by the gesture detection device 1 may be used to control the motion of a cursor 91, and the click event (e.g. a single click or multi-click) may be used to activate an application associated with a selected icon.

Figure 5:
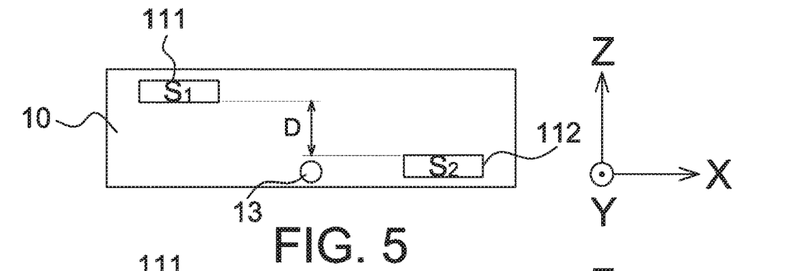
FIG. 5 shows an upper view of a first aspect of the gesture detection device according to the embodiment of the present disclosure.

Referring to FIGS. 2A, 2B and 5, FIG. 5 shows an upper view of a first aspect of the gesture detection device 1 according to the first embodiment of the present disclosure. In this aspect, the first image sensor 111 is disposed on the detection surface 10 and configured to capture a first image $IF_1$ substantially along the normal direction "n"; the second image sensor 112 is disposed on the detection surface 10 offsetting a predetermined distance D from the first image sensor 111 along a Z-axis and configured to capture a second image $IF_2$ substantially along the normal direction "n"; and the processing unit 12 is configured to calculate an X-axis coordinate according to a position of a pointer image in the first image $IF_1$ or the second image $IF_2$, calculate a Y-axis coordinate according to a disparity of pointer images in the first image $IF_1$ and the second image $IF_2$, and identify a click event along the Z-axis when a size difference of the pointer images between the first image $IF_1$ and the second image $IF_2$ is larger than or equal to a difference threshold. Methods of identifying the X-axis coordinate, the Y-axis coordinate and the click event are described below.

Figure 8:
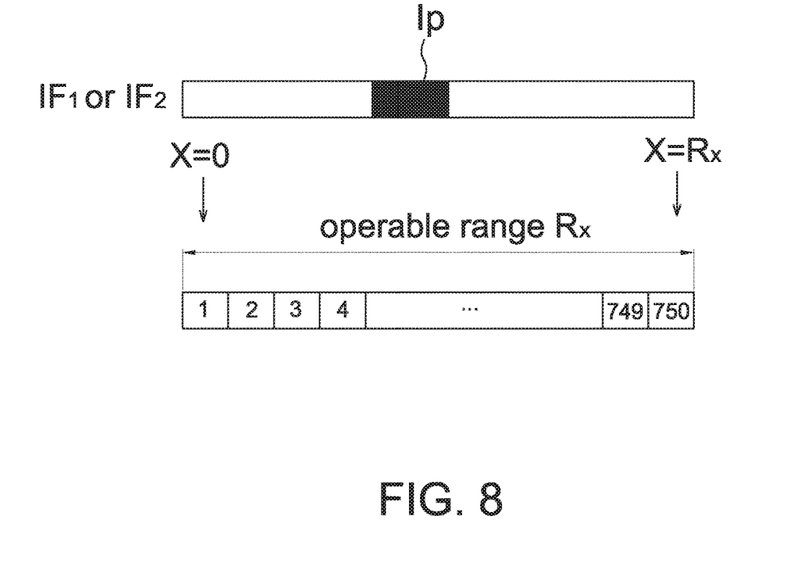
FIG. 8 shows a schematic diagram of calculating an X-axis coordinate in the gesture detection device according to the embodiment of the present disclosure.

Referring to FIG. 8, when a pointer image Ip is contained in the first image $IF_1$ or the second image $IF_2$, the pointer image Ip may cover a plurality of pixels. The processing unit 12 may calculate a position of the pointer image Ip (e.g. a center position or a gravity center position of the pointer image Ip) to be served as the X-axis coordinate. For example in one embodiment, it is assumed that the image sensor includes a linear image sensor array having a size of 750×1 such that every pixel position within an operable range 0-Rx (e.g. 0-750 herein) may be set to respectively correspond to one X-axis coordinate. Therefore, the processing unit 12 may calculate a position of the pointer image Ip within the operable range 0-Rx to be served as the X-axis coordinate.

If the X-axis coordinate is configured to be mapped to a projection screen, the processing unit 12 may further map the X-axis coordinate onto a correct position of the projection screen according to a ratio relationship between an X-axis resolution of the projection screen and the operable range, wherein the mapping method is well known and thus details thereof are not described herein. It is appreciated that in this embodiment, the operable range may include only the central part of the linear image sensor array (for example, but not limited to, from 50 pixels to 700 pixels) without including pixels at two edges so as to avoid miscalculation of the position when the pointer image Ip locates at the two edges.

Figure 9:
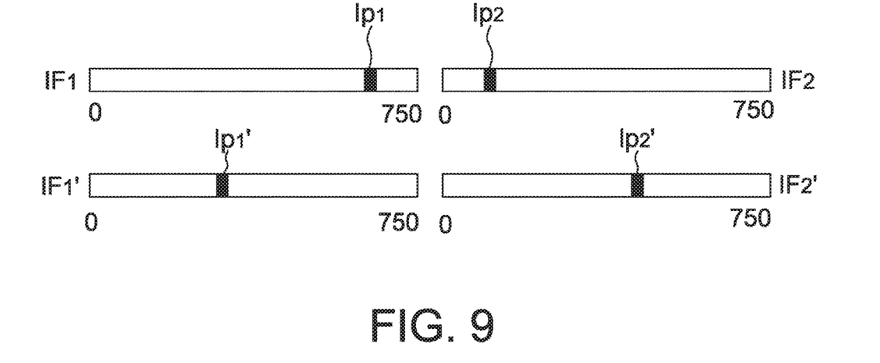
FIG. 9 shows a schematic diagram of calculating a Y-axis coordinate in the gesture detection device according to the embodiment of the present disclosure.

Referring to FIG. 9, when the first image $IF_1$ and the second image $IF_2$ respectively contain a pointer image, the processing unit 12 respectively calculates a position (e.g. a center position or a gravity center position) of a first pointer image $Ip_1$ in the first image $IF_1$ and a second pointer image $Ip_2$ in the second image $IF_2$. Then, the processing unit 12 calculates a position difference between positions of the first pointer image $Ip_1$ and the second pointer image $Ip_2$ to be served as a disparity. For example, when a pointer is farther from the image sensors, the first pointer image $Ip_1$ and the second pointer image $Ip_2$ are closer to each other; whereas when the pointer is closer to the image sensors, the first pointer image $Ip_1'$ and the second pointer image $Ip_2'$ are farther from each other. Therefore, every disparity may be set to correspond to one Y-axis coordinate, and the processing unit 12 may calculate the disparity to be served as the Y-axis coordinate.

It is appreciated that the gesture detection device 1 according to the embodiment of the present disclosure may include a storage unit configured to save the relation between the X-axis coordinate versus the position of the pointer image Ip and the relation between the Y-axis coordinate versus the disparity.

Figure 10A:
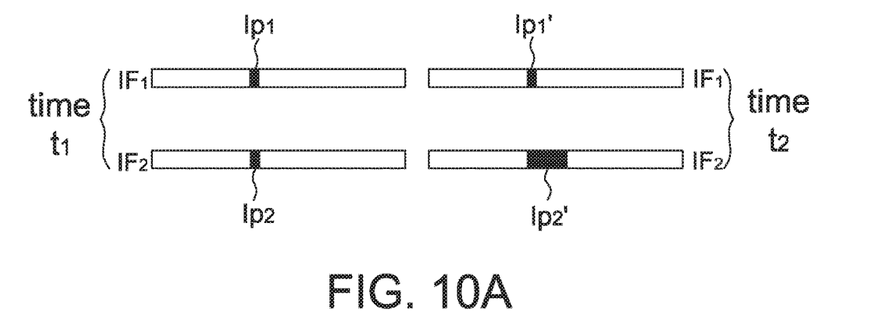
FIGS. 10A and 10B show schematic diagrams of identifying a click event in the gesture detection device according to the embodiment of the present disclosure.

Referring to FIG. 10A, in this aspect the first image sensor 111 and the second image sensor 112 are configured to detect a hovering operation of a finger and a click event. For example, at time $t_1$, if the first pointer image $Ip_1$ in the first image $IF_1$ and the second pointer image $Ip_2$ in the second image $IF_2$ have substantially identical areas or widths, it means that it is the finger of user between the first image sensor 111 and the second image 112, and the user is performing the hovering operation now. In hovering operation the X-axis coordinate and Y-axis coordinate may be calculated by the method of FIGS. 8 and 9 to be served as the two-dimensional hover coordinate. At time $t_2$, if the first pointer image $Ip_1$ in the first image $IF_1$ and the second pointer image $Ip_2$ in the second image $IF_2$ have different areas or widths, it means that the finger of user is moved forward (i.e. along the Z-axis) such that the first image sensor 111 detects the finger image but the second image sensor 12 detects a partial image of the first or palm. In this case, it is able to identify that a click event occurs at the time $t_2$.

In this embodiment, when the processing unit 12 identifies that a size difference of the pointer images between the first image $IF_1$ and the second image $IF_2$ captured at the same time (i.e. the same sampling period) is larger than or equal to a difference threshold, a click event along the Z-axis is identified.

In addition, in this aspect the processing unit 12 identifies the size difference of the pointer images between the image frames captured at the same sampling period by different image sensors, and the purpose is to distinguish the difference between finger image from first image or palm image. However, when the first image sensor 111 and the second image sensor 112 detect images of other parts of human body (e.g. a wrist image), the first pointer image $Ip_1$ in the first image $IF_1$ and the second pointer image $Ip_2$ in the second image $IF_2$ may also have substantially identical widths or areas. In order to avoid this situation, when sizes of the pointer images in the first image $IF_1$ and the second image $IF_2$ are larger than a predetermined size (e.g. an upper limit may be set according to actual finger images), the processing unit may not activate so as to avoid misoperation; that is, the X-axis coordinate and the Y-axis coordinate are not calculated and the click event is not identified.

In addition, in order to eliminate the interference from ambient light, the light source 13 may emit light with difference brightness values corresponding to the image capturing of the first image sensor 111 and the second image sensor 112. For example referring to FIG. 12, the light source 13 emits light alternative in a first brightness value $B_1$ and a second brightness value $B_2$ corresponding to the image capturing of the image sensors. The first image sensor 111 and the second image sensor 112 respectively capture a bright image $IF_B$ corresponding to the first brightness value $B_1$ and respectively capture a dark image $IF_D$ corresponding to the second brightness value $B_2$. The processing unit 12 further calculates a differential image ($IF_B$-$IF_D$) between the bright image $IF_B$ and the dark image $IF_D$ captured by each image sensor so as to eliminate the interference from ambient light, wherein the second brightness value $B_2$ may be zero or nonzero brightness. In other words, in the above aspect, the first image $IF_1$ and the second image $IF_2$ may both be differential images. In this aspect, the bright image is referred to an image frame captured when the light source 13 turns on and the dark image is referred to an image frame captured when the light source 13 turns off or emits light in a lower brightness value.

Figure 6:
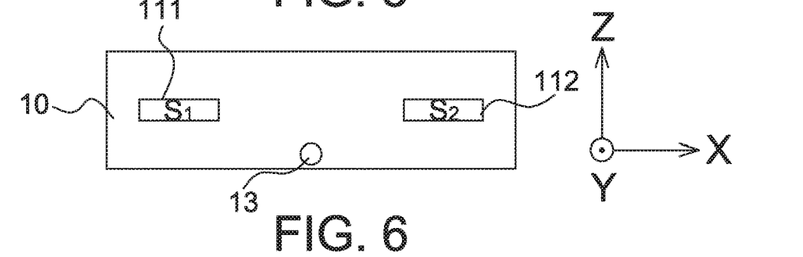
FIG. 6 shows an upper view of a second aspect of the gesture detection device according to the embodiment of the present disclosure.

Referring to FIGS. 2A, 2B and 6, FIG. 6 shows an upper view of a second aspect of the gesture detection device 1 according to the first embodiment of the present disclosure. In this aspect, the first image sensor 111 is disposed on the detection surface 10 and configured to capture first images $IF_1$ substantially along the normal direction "n"; the second image sensor 112 is disposed on the detection surface 10 parallel to the first image sensor 111 (i.e. no position offset along the Z-axis) and configured to capture second images $IF_2$ substantially along the normal direction "n"; and the processing unit 12 is configured to calculate an X-axis coordinate according to a position of a pointer image in the first images $IF_1$ or the second images $IF_2$, calculate a Y-axis coordinate according to a disparity of pointer images in the first images $IF_1$ and the second images $IF_2$, and identify a click event when a size variation of the pointer images between the first images $IF_1$ captured at different times and/or between the second images $IF_2$ captured at different times is larger than or equal to a variation threshold. The difference between the second aspect and the first aspect is that in the second aspect there is no position offset between the first image sensor 111 and the second image sensor along the Z-axis. In this aspect, methods of calculating the X-axis coordinate and the Y-axis coordinate are identical to those of the first aspect (referring to FIGS. 8 and 9) and thus details thereof are not repeated herein. The method of identifying the click event is illustrated hereinafter.

Figure 10B:
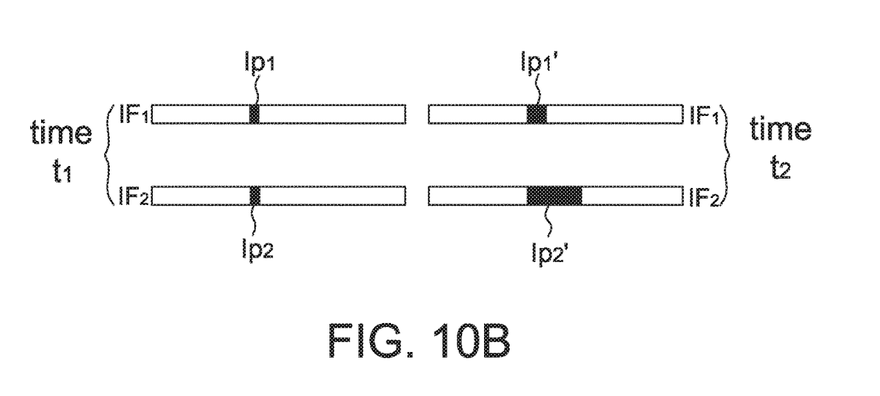

Referring to FIG. 10B, in this aspect the first image sensor 111 and the second image sensor 112 are also configured to detect a hovering operation of a finger and a click event. For example at time $t_1$, if the first pointer image $Ip_1$ in the first image $IF_1$ and the second pointer image $Ip_2$ in the second image $IF_2$ have substantially identical areas or widths, it means that it is the finger of user between the first image sensor 111 and the second image 112, and the user is performing the hovering operation now. In hovering operation the X-axis coordinate and Y-axis coordinate may be calculated by the method of FIGS. 8 and 9 to be served as the two-dimensional hover coordinate. At time $t_2$, if the areas or widths of the first pointer image $Ip_1'$ in the first image $IF_1'$ and the second pointer image $Ip_2$ in the second image $IF_2'$ have a change, it means that the finger of user is moved forward such that the first image sensor 111 and/or the second image sensor 12 detects a partial image of the first or palm, and it is able to identify that a click event occurs at the time $t_2$. In this embodiment, when the processing unit 12 identifies a size variation (e.g. the size variation between $Ip_1$ and $Ip_1'$ and/or the size variation between $Ip_2$ and $Ip_2'$) of the pointer images between the first images $IF_1$ captured at different times (i.e. different sampling times, e.g. $t_1$ and $t_2$) and/or between the second images $IF_2$ captured at different times is larger than or equal to a variation threshold, a click event along the Z-axis is identified, wherein the size variation associated with the first images $IF_1$ and the second images $IF_2$ may be different. In this aspect, the times $t_1$ and $t_2$ are preferably two adjacent sampling times.

As mentioned above, in order to avoid misoperation, in this aspect when sizes of the pointer images in the first image $IF_1$ and the second image $IF_2$ are larger than a predetermined size, the processing unit 12 does not activate.

Figure 12:
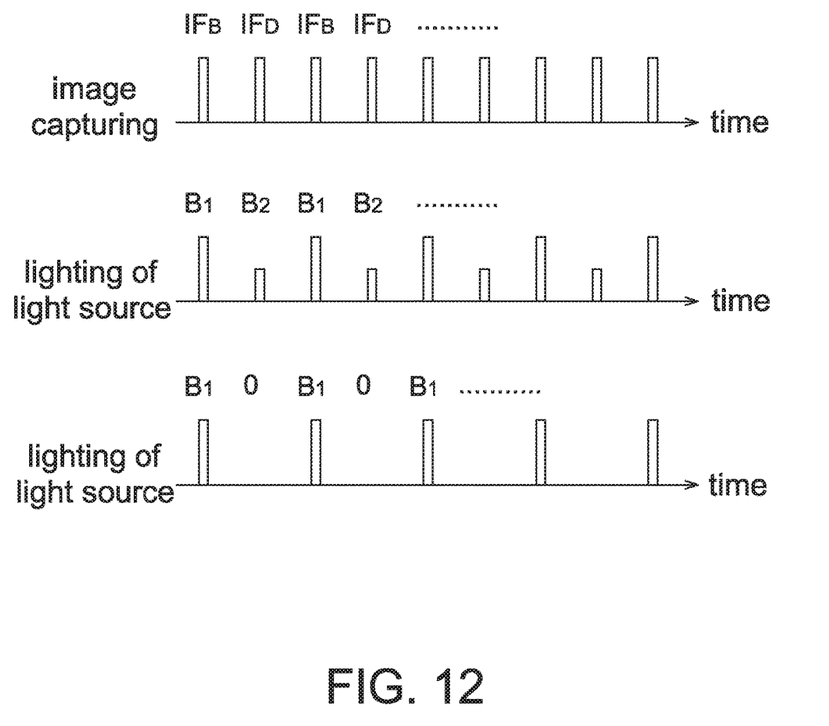
FIG. 12 shows a schematic diagram of the lighting of light source and the image capturing of image sensor in the gesture detection device according to the embodiment of the present disclosure.

Similarly, in order to eliminate the influence of ambient light, in this aspect the light source 13 may emit light of different brightness values alternatively corresponding to the image capturing of the image sensors 111 and 112 as shown in FIG. 12 to allow the processing unit 12 to calculate the differential image.

Figure 7A:
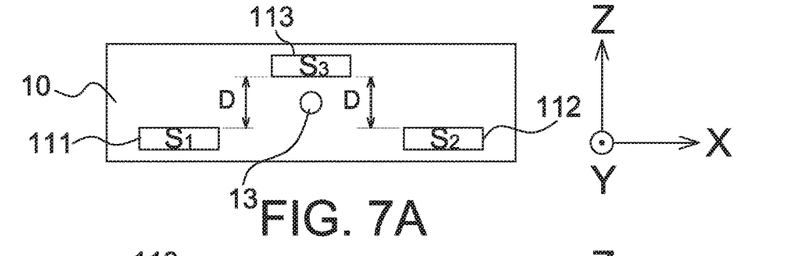
FIGS. 7A-7C show upper views of a third aspect of the gesture detection device according to the embodiment of the present disclosure.

Referring to FIGS. 2A, 2B and 7A, FIG. 7A shows an upper view of a third aspect of the gesture detection device 1 according to the first embodiment of the present disclosure. This aspect includes a first image sensor 111, a second image sensor 112 and a third image sensor 113, wherein the first image sensor 111 is disposed on the detection surface 10 and configured to capture a first image $IF_1$ substantially along the normal direction "n"; the second image sensor 112 is disposed on the detection surface 10 parallel to the first image sensor 111 (i.e. no position offset along the Z-axis) and configured to capture a second image $IF_2$ substantially along the normal direction "n"; and the third image sensor 113 is disposed on the detection surface 10 offsetting a predetermined distance D from the first image sensor 111 and the second image sensor along a Z-axis and configured to capture a third image $IF_3$ substantially along the normal direction "n". In this aspect, the processing unit 12 is configured to calculate a two-dimensional coordinate according to the first image $IF_1$ and the second image $IF_2$; i.e. the X-axis coordinate and Y-axis coordinate, wherein the method of calculating the two-dimensional coordinate is identical to that of the first aspect (referring to FIGS. 8 and 9) and thus details thereof are not repeated herein. In addition, the processing unit 12 is further configured to identify a click event along the Z-axis when a size difference between a pointer image in the first image $IF_1$ and a pointer image in the third image $IF_3$ or between a pointer image in the second image $IF_2$ and the pointer image in the third image $IF_3$ is larger than or equal to a difference threshold, wherein the method of identifying a click event is identical to that of the first aspect (referring to FIG. 10A) and thus details thereof are not repeated herein.

Figure 7B:
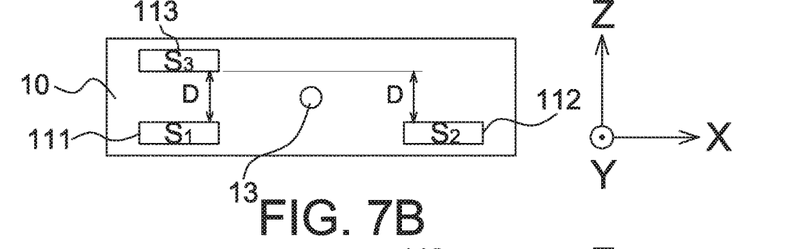
Figure 7C:
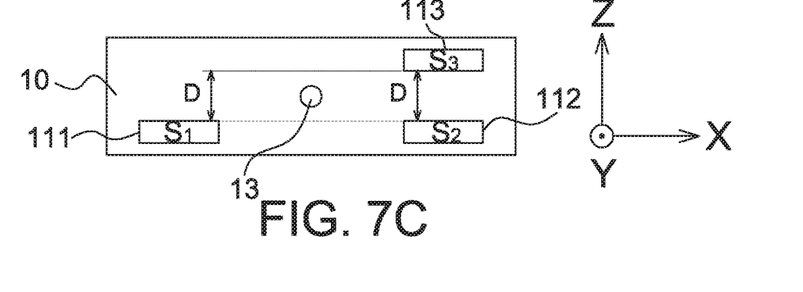

More specifically speaking, in the third aspect the processing unit 12 calculates the two-dimensional coordinate according to the two image sensors disposed in parallel (similar to FIG. 6) and identifies the click event according to the two image sensors having a position offset along the Z-axis (similar to FIG. 5). However, the arrangement of the image sensors is not limited to FIG. 7A, the image sensors may be arranged in the way as shown in FIGS. 7B and 7C, wherein in FIGS. 7A-7C the hover coordinate is calculated according to the image frames captured by the first image sensor 111 and the second image sensor 112. In addition in FIG. 7B, the processing unit 12 identifies the click event according to the image frames captured by the second image sensor 112 and the third image sensor 113. In FIG. 7C, the processing unit 12 identifies the click event according to the image frames captured by the first image sensor 11 and the third image sensor 113.

As mentioned above, in order to avoid misoperation, in this aspect when sizes of the pointer images in the first image $IF_1$ and the second image $IF_2$ are larger than a predetermined size, the processing unit 12 does not activate.

Similarly, in order to eliminate the influence of ambient light, in this aspect the light source 13 may emit light of different brightness values alternatively corresponding to the image capturing of the image sensors 111 to 113 as shown in FIG. 12 to allow the processing unit 12 to calculate the differential image.

Referring to FIGS. 3A, 3B and 5, FIG. 5 shows an upper view of a first aspect of the gesture detection device 1 according to the second embodiment of the present disclosure. In this aspect, the first image sensor 111 is disposed on the detection surface 10 and configured to capture a first image $IF_1$ toward a direction deviating a predetermined angle (e.g. +θ) from the normal direction "n"; the second image sensor 112 is disposed on the detection surface 10 offsetting a predetermined distance D from the first image sensor 111 along a Z-axis and configured to capture a second image $IF_2$ toward a direction deviating a negative predetermined angle (e.g. −θ) from the normal direction "n"; and the processing unit 12 is configured to calculate a two-dimensional coordinate according to positions of pointer images in the first image $IF_1$ and the second image $IF_2$, and identify a click event along the Z-axis when a size difference of the pointer images between the first image $IF_1$ and the second image $IF_2$ is larger than or equal to a difference threshold. The difference between this aspect and the first aspect of the first embodiment is that in this aspect the image sensors incline a predetermined angle (e.g. θ) toward each other to capture images such that the pointer may be within field of views of all image sensors when the image sensors are separated by a larger distance. In this aspect, the method of identifying the click event is identical to that of the first aspect of the first embodiment (referring to FIG. 10A); i.e. when the processing unit 12 identifies that a size difference (e.g. the difference between $Ip_2'$ and $Ip_1'$) of the pointer images between the first image $IF_1$ and the second image $IF_2$ captured at the same time is larger than or equal to a difference threshold, a click event along the Z-axis is identified. The method of calculating the two-dimensional coordinate is illustrated hereinafter.

Figure 11:
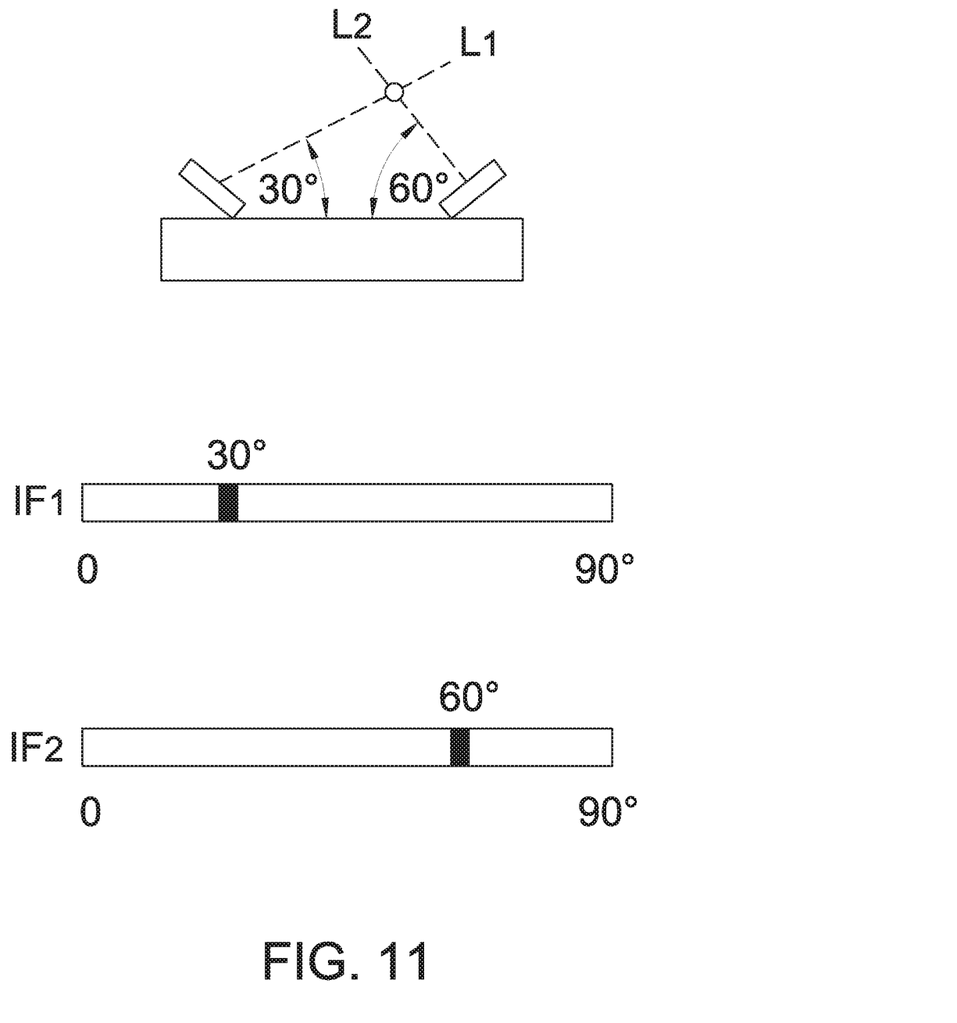
FIG. 11 shows a schematic diagram of calculating the two-dimensional coordinate of a hovering pointer in the gesture detection device according to the embodiment of the present disclosure.

Referring to FIG. 11, in this aspect the X-axis coordinate and the Y-axis coordinate may be obtained simultaneously according to the first image $IF_1$ and the second image $IF_2$. For example, each position of the first image $IF_1$ and the second image $IF_2$ corresponds to a relative angle of the pointer position. Accordingly, when a pointer enters field of views of the first image sensor 111 and the second image sensor 112, the processing unit 12 may calculate a pointer image position (e.g. the center or gravity center) of pointer images in the first image 111 and the second image 112, and each pointer image position corresponds to one angle, e.g. 30 and 60 degrees shown herein. Meanwhile, if one of the first image sensor 111 and the second image sensor 112 is set as the original point, i.e. having a plane coordinate (0,0), two linear equations, e.g. $L_1$ and $L_2$ may be determined. The processing unit 12 may calculate the cross point coordinate of the two linear equations $L_1$ and $L_2$ to be served as the two-dimensional coordinate of the pointer position. In another embodiment, a lookup table of two-dimensional coordinates versus two angles associated with pointer image positions may be constructed previously, and the processing unit 12 may determine the two-dimensional coordinate according to the pointer image positions in the first image $IF_1$ and the second image $IF_2$ as well as the lookup table.

As mentioned above, in order to avoid misoperation, in this aspect when sizes of the pointer images in the first image $IF_1$ and the second image $IF_2$ are larger than a predetermined size, the processing unit 12 does not activate.

Similarly, in order to eliminate the influence of ambient light, in this aspect the light source 13 may emit light of different brightness values alternatively corresponding to the image capturing of the image sensors 111 and 112 as shown in FIG. 12 to allow the processing unit 12 to calculate the differential image.

Referring to FIGS. 3A, 3B and 6, FIG. 6 shows an upper view of a second aspect of the gesture detection device 1 according to the second embodiment of the present disclosure. In this aspect, the first image sensor 111 is disposed on the detection surface 10 and configured to capture first images $IF_1$ toward a direction deviating a predetermined angle (e.g. +θ) from the normal direction "n"; the second image sensor 112 is disposed on the detection surface 10 parallel to the first image sensor 111 (i.e. no position offset along the Z-axis) and configured to capture second images $IF_2$ toward a direction deviating a negative predetermined angle (e.g. −θ) from the normal direction "n"; and the processing unit 12 is configured to calculate a two-dimensional coordinate according to positions of pointer images in the first images $IF_1$ and the second images $IF_2$, and identify a click event when a size variation of the pointer images between the first images $IF_1$ captured at different times (i.e. different sampling times) and between the second images $IF_2$ captured at different times is larger than or equal to a variation threshold. The difference between this aspect and the second aspect of the first embodiment is that in this aspect the image sensors incline a predetermined angle (e.g. θ) toward each other to capture images such that the pointer may be within field of views of all image sensors when the image sensors are separated by a larger distance. In this aspect, the method of identifying the click event is identical to that of the second aspect of the first embodiment (referring to FIG. 10B); i.e. when the processing unit 12 identifies a size variation (e.g. the size variation between $Ip_1$ and $Ip_1'$ and/or the size variation between $Ip_2$ and $Ip_2'$) of the pointer images between the first images $IF_1$ captured at different times and/or between the second images $IF_2$ captured at different times is larger than or equal to a variation threshold, a click event along the Z-axis is identified. The method of calculating the two-dimensional coordinate is identical to that of the first aspect of the second embodiment (referring to FIG. 11) and thus details thereof are not repeated herein.

Briefly speaking, the processing unit 12 identifies the click event according to the variation of the pointer images between the image frames captured at different sampling times by the image sensors, and determines the two-dimensional coordinate according to two linear equations formed according to positions of the pointer images in the first image $IF_1$ and the second image $IF_2$ or according to a lookup table and positions of the pointer images in the first image $IF_1$ and the second image $IF_2$.

As mentioned above, in order to avoid misoperation, in this aspect when sizes of the pointer images in the first image $IF_1$ and the second image $IF_2$ are larger than a predetermined size, the processing unit 12 does not activate.

Similarly, in order to eliminate the influence of ambient light, in this aspect the light source 13 may emit light of different brightness values alternatively corresponding to the image capturing of the image sensors 111 and 112 as shown in FIG. 12 to allow the processing unit 12 to calculate the differential image.

Referring to FIGS. 3A, 3B and 7A, FIG. 7A shows an upper view of a third aspect of the gesture detection device 1 according to the second embodiment of the present disclosure. This aspect includes a first image sensor 111, a second image sensor 112 and a third image sensor 113, wherein the first image sensor 111 is disposed on the detection surface 10 and configured to capture a first image $IF_1$ toward a direction deviating a predetermined angle (e.g. +θ) from the normal direction "n"; the second image sensor 112 is disposed on the detection surface 10 parallel to the first image sensor 111 (i.e. no position offset along the Z-axis) and configured to capture a second image $IF_2$ toward a direction deviating a negative predetermined angle (e.g. −θ) from the normal direction "n"; and the third image sensor 113 is disposed on the detection surface 10 offsetting a predetermined distance D from the first image sensor 111 and the second image sensor 112 along a Z-axis and configured to capture a third image $IF_3$ substantially along the normal direction "n". In this aspect, the processing unit 12 is configured to calculate a two-dimensional coordinate according to the first image $IF_1$ and the second image $IF_2$; i.e. the X-axis coordinate and Y-axis coordinate, wherein the method of calculating the two-dimensional coordinate is identical to that of the first aspect of the second embodiment (referring to FIG. 11) and thus details thereof are not repeated herein. In addition, the processing unit 12 is further configured to identify a click event along the Z-axis when a size difference between a pointer image in the first image $IF_1$ and a pointer image in the third image $IF_3$ or between a pointer image in the second image $IF_2$ and the pointer image in the third image $IF_3$ is larger than or equal to a difference threshold, wherein the method of identifying a click event is identical to that of the first aspect of the first embodiment (referring to FIG. 10A) and thus details thereof are not repeated herein. In addition, a deviation direction of the center line of the field of view of the third image sensor 113 with respect to the normal line may be determined according to the disposed position of the third image sensor 113. For example, in FIG. 7B the third image sensor 113 may rotate toward the right hand side (e.g. +θ) whereas in FIG. 7C the third image sensor 113 may rotate toward the left hand side (e.g. −θ).

Briefly speaking, in this aspect the processing unit 12 identifies the click event according to the difference between pointer images in the image frames captured at the same sampling time by the two image sensors having a position offset in the Z-axis, and determines the two-dimensional coordinate according to two linear equations formed according to positions of the pointer images in the two image sensors disposed in parallel or according to a lookup table and positions of the pointer images in the two image sensors disposed in parallel.

As mentioned above, in order to avoid misoperation, in this aspect when sizes of the pointer images in the first image $IF_1$ and the second image $IF_2$ are larger than a predetermined size, the processing unit 12 does not activate.

Similarly, in order to eliminate the influence of ambient light, in this aspect the light source 13 may emit light of different brightness values alternatively corresponding to the image capturing of the image sensors 111 to 113 as shown in FIG. 12 to allow the processing unit 12 to calculate the differential image.

In every aspect of the present disclosure, the at least two image sensors (e.g. 111-113) preferably capture image frames synchronously. It should be mentioned that the XYZ-axes shown in FIGS. 5-7C are only intended to illustrate but not to limit the present disclosure.

As mentioned above, it is difficult for the conventional optical gesture recognition system to identify the click event so that the applicable functions are limited. Therefore, the present disclosure further provides a gesture detection device (FIGS. 1, 2A-2B and 3A-3B) that may perform both the hovering operation and the click operation and eliminate the environmental interference by calculating the differential image.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A gesture detection device, comprising:
   a detection surface having a normal direction;
   an infrared light source;
   a first image sensor disposed on the detection surface, and configured to capture, along a direction deviating a predetermined angle from the normal direction, a first image when the infrared light source is emitting light; and
   a second image sensor disposed on the detection surface, offset by a predetermined distance from the first image sensor along a Z-axis, and the second image sensor configured to capture, along a direction deviating a negative predetermined angle from the normal direction, a second image when the infrared light source is emitting light,
   wherein the detection surface has two opposite long edges along an X-axis and two opposite short edges along the Z-axis, and the first image sensor and the second image sensor are distanced by a distance along the X-axis.

2. The gesture detection device as claimed in claim 1, wherein the first image sensor and the second image sensor comprise a linear image sensor array.

3. The gesture detection device as claimed in claim 1, wherein a width of the first image sensor and the second image sensor includes 1 to 6 pixels.

4. The gesture detection device as claimed in claim 1, wherein
   the first image sensor has a sensing surface, which rotates with respect to the detection surface by the predetermined angle, and
   the second image sensor has a sensing surface, which rotates with respect to the detection surface by the negative predetermined angle.

5. The gesture detection device as claimed in claim 1, wherein the predetermined angle is between 30 to 60 degrees.

6. The gesture detection device as claimed in claim 1, wherein the infrared light source is arranged between the first image sensor and the second image sensor in the X-axis.

7. The gesture detection device as claimed in claim 6, wherein the infrared light source is arranged parallel to one of the first image sensor and the second image sensor in the X-axis.

8. A gesture detection device, comprising:
   a detection surface having a normal direction;
   an infrared light source;
   a first image sensor disposed on the detection surface, and configured to capture, along a direction deviating a predetermined angle from the normal direction, first images when the infrared light source is emitting light; and
   a second image sensor disposed on the detection surface parallel to the first image sensor in an X-axis, and the second image sensor configured to capture, along a direction deviating a negative predetermined angle from the normal direction, second images when the infrared light source is emitting light,
   wherein the detection surface has two opposite long edges along the X-axis and two opposite short edges along a Z-axis, and the first image sensor and the second image sensor are distanced by a distance along the X-axis.

9. The gesture detection device as claimed in claim 8, wherein the first image sensor and the second image sensor comprise a linear image sensor array.

10. The gesture detection device as claimed in claim 8, wherein a width of the first image sensor and the second image sensor includes 1 to 6 pixels.

11. The gesture detection device as claimed in claim 8, wherein
    the first image sensor has a sensing surface, which rotates with respect to the detection surface by the predetermined angle, and
    the second image sensor has a sensing surface, which rotates with respect to the detection surface by the negative predetermined angle.

12. The gesture detection device as claimed in claim 8, wherein the predetermined angle is between 30 to 60 degrees.

13. The gesture detection device as claimed in claim 8, wherein the infrared light source is arranged between the first image sensor and the second image sensor in the X-axis.

14. The gesture detection device as claimed in claim 13, wherein the infrared light source is arranged not to parallel to the first image sensor and the second image sensor in the X-axis s.

15. A gesture detection device, comprising:
    a detection surface having a normal direction;
    an infrared light source;
    a first image sensor disposed on the detection surface, and configured to capture, along a direction deviating a predetermined angle from the normal direction, a first image at when the infrared light source is emitting light;
    a second image sensor disposed on the detection surface parallel to the first image sensor in an X-axis, and the second image sensor configured to capture, along a direction deviating a negative predetermined angle from the normal direction, a second image when the infrared light source is emitting light; and
    a third image sensor disposed on the detection surface, offset by a predetermined distance from the first image sensor and the second image sensor along a Z-axis, and the third image sensor configured to capture, along the normal direction, a third image when the infrared light source is emitting light,
    wherein the detection surface has two opposite long edges along the X-axis and two opposite short edges along the Z-axis, and the first image sensor and the second image sensor are distanced by a distance along the X-axis.

16. The gesture detection device as claimed in claim 15, wherein the first image sensor, the second image sensor and the third image sensor comprise a linear image sensor array.

17. The gesture detection device as claimed in claim 15, wherein a width of the first image sensor, the second image sensor and the third image sensor includes 1 to 6 pixels.

18. The gesture detection device as claimed in claim 15, wherein
    the first image sensor has a sensing surface, which rotates with respect to the detection surface by the predetermined angle, and
    the second image sensor has a sensing surface, which rotates with respect to the detection surface by the negative predetermined angle.

19. The gesture detection device as claimed in claim 15, wherein the predetermined angle is between 30 to 60 degrees.

20. The gesture detection device as claimed in claim 15, wherein the infrared light source is arranged
    between the first image sensor and the second image sensor in the X-axis, and
    not to parallel to the first image sensor and the second image sensor in the X-axis.

* * * * *